(12) United States Patent
Keller et al.

(10) Patent No.: US 10,155,602 B2
(45) Date of Patent: Dec. 18, 2018

(54) MAGNETRON CONTROL SYSTEM AND ASSOCIATED METHODOLOGY

(71) Applicant: ConAgra Foods RDM, Inc., Omaha, NE (US)

(72) Inventors: Karl Keller, Rafz (CH); Silvia Kurtz, Eglisau (CH); David Wiemann, Omaha, NE (US); Rebecca Jahn, Omaha, NE (US); Scott Lineback, Seattle, WA (US); Faisal K. Abou-Nasr, Omaha, NE (US); Ryan T. Grace, Omaha, NE (US)

(*) Notice: Subject to any disclaimer, the term of this patent is extended or adjusted under 35 U.S.C. 154(b) by 147 days.

(21) Appl. No.: 15/237,930

(22) Filed: Aug. 16, 2016

(65) Prior Publication Data

US 2016/0355287 A1 Dec. 8, 2016

Related U.S. Application Data

(63) Continuation-in-part of application No. 14/300,615, filed on Jun. 10, 2014, which is a continuation of
(Continued)

(30) Foreign Application Priority Data

Feb. 10, 2005 (CH) ........................ 0219/05

(51) Int. Cl.
*H05B 6/80* (2006.01)
*H05B 6/68* (2006.01)
(Continued)

(52) U.S. Cl.
CPC .............. *B65B 55/14* (2013.01); *A23L 3/003* (2013.01); *A23L 3/01* (2013.01); *A23L 3/04* (2013.01);
(Continued)

(58) Field of Classification Search
CPC ... A23L 3/04; A23L 3/01; A23L 3/003; B65B 31/04; B65B 55/14; B65B 31/08;
(Continued)

(56) References Cited

U.S. PATENT DOCUMENTS 1,936,123 A 11/1933 Willstatter
1,973,634 A 9/1934 Lang
(Continued)

FOREIGN PATENT DOCUMENTS

DE 10210833 9/2003
EP 468546 1/1992
(Continued)

OTHER PUBLICATIONS

Formal Translation of EP1359097, published Nov. 5, 2003.
(Continued)

*Primary Examiner* — Quang Van
(74) *Attorney, Agent, or Firm* — Ryan T. Grace; Advent, LLP

(57) ABSTRACT

A process is disclosed for controlling a plurality of magnetrons of a thermal processing tunnel in accordance with a preconfigured magnetron actuation scheme. In some implementations, the process can include the steps of: receiving an identifier indicating a predefined packaged food product configuration; based on the identifier, obtaining a preconfigured magnetron actuation scheme that is preconfigured based on at least one characteristic of the predefined packaged food product configuration, wherein the preconfigured magnetron actuation scheme is preconfigured to cause at least one of the plurality of magnetrons to have a different execution characteristic than at least one other magnetron of the plurality of magnetrons; and transmitting at least one instruction in accordance with the preconfigured magnetron actuation scheme to a signal controller that drives the
(Continued)

plurality of magnetrons, thereby causing the plurality of magnetrons to execute in accordance with the preconfigured magnetron actuation scheme.

10 Claims, 10 Drawing Sheets

Related U.S. Application Data application No. 11/883,675, filed as application No. PCT/CH2006/000063 on Feb. 1, 2006, now abandoned.

(51) Int. Cl.

| | |
|---|---|
| F24C 15/32 | (2006.01) |
| B65B 55/14 | (2006.01) |
| A23L 3/01 | (2006.01) |
| B65B 31/08 | (2006.01) |
| B65B 25/00 | (2006.01) |
| A23L 3/04 | (2006.01) |
| B65B 31/04 | (2006.01) |
| B65D 77/22 | (2006.01) |
| B65D 81/34 | (2006.01) |
| A23L 3/00 | (2006.01) |

(52) U.S. Cl.
CPC ............ *B65B 25/001* (2013.01); *B65B 31/04* (2013.01); *B65B 31/08* (2013.01); *B65D 77/225* (2013.01); *B65D 81/3453* (2013.01); *B65D 2205/00* (2013.01)

(58) Field of Classification Search
CPC ................ B65B 25/001; B65D 77/225; B65D 81/3453; B65D 2205/00
USPC ............... 219/728, 730, 702, 660, 700, 701, 219/506.745, 750; 126/21 A; 426/234, 426/241, 243
See application file for complete search history.

(56) References Cited

U.S. PATENT DOCUMENTS

| | | |
|---|---|---|
| 2,412,031 A | 12/1946 | Samuel Bergstein |
| 2,442,161 A | 5/1948 | Samuel Bergstein |
| 2,506,769 A | 5/1950 | Samuel Bergstein |
| 3,311,287 A | 3/1967 | Long et al. |
| 3,347,012 A | 10/1967 | Scholle |
| 3,435,948 A | 4/1969 | Kagnov Alan Lawrence |
| 3,851,080 A | 11/1974 | White et al. |
| 3,889,009 A | 6/1975 | Lipoma |
| 4,444,219 A | 4/1984 | Hollenstein |
| 4,779,398 A | 10/1988 | Glandon et al. |
| 4,962,298 A | 10/1990 | Ferrari et al. |
| 5,032,458 A | 7/1991 | Dallmann et al. |
| 5,247,746 A | 9/1993 | Johnson et al. |
| 5,251,424 A | 10/1993 | Zenger et al. |
| 5,370,883 A | 12/1994 | Saunier |
| 5,804,265 A | 9/1998 | Saad et al. |
| 5,885,640 A | 3/1999 | Anderson |
| 5,974,686 A | 11/1999 | Nomura et al. |
| 6,023,915 A | 2/2000 | Colombo |
| 6,210,730 B1 | 4/2001 | Mitchell |
| 6,280,787 B1 | 8/2001 | Perry |
| 6,300,469 B1 | 10/2001 | Freundlich et al. |
| 6,334,710 B1 | 1/2002 | Kuge et al. |
| 6,380,524 B1 | 4/2002 | Keller |
| 6,607,764 B1 | 8/2003 | Keller |
| 6,814,991 B2 | 11/2004 | Hiyoshi |
| 6,868,302 B2 | 3/2005 | Kobayashi et al. |
| 2003/0091705 A1 | 5/2003 | Lidster |
| 2003/0152679 A1 | 8/2003 | Garwood |
| 2004/0060458 A1 | 4/2004 | Janka |
| 2004/0062838 A1 | 4/2004 | Castellanos et al. |
| 2004/0151812 A1 | 8/2004 | Bell |
| 2005/0155325 A1 | 7/2005 | Abercrombie et al. |
| 2006/0000545 A1 | 1/2006 | Nageli et al. |
| 2006/0254217 A1 | 11/2006 | Marcus et al. |
| 2007/0137633 A1* | 6/2007 | McFadden ............ A21B 1/245 126/21 A |
| 2008/0078759 A1 | 4/2008 | Wnek et al. |
| 2008/0116202 A1 | 5/2008 | Auer et al. |
| 2008/0317912 A1 | 12/2008 | Keller et al. |
| 2009/0283517 A1* | 11/2009 | MacKay ................ H05B 6/782 219/700 |

FOREIGN PATENT DOCUMENTS

| | | |
|---|---|---|
| EP | 1076012 | 2/2001 |
| EP | 1291298 | 3/2003 |
| EP | 1357054 | 10/2003 |
| EP | 1357055 | 10/2003 |
| EP | 1359097 | 11/2003 |
| EP | 1422163 | 5/2004 |
| FR | 2648109 | 12/1990 |
| GB | 2251541 | 7/1992 |
| JP | 61015673 | 1/1986 |
| JP | 05033941 | 2/1993 |
| JP | 11227716 | 8/1999 |
| RU | 2323603 | 5/2008 |
| RU | 2341112 | 12/2008 |
| WO | 0003605 | 1/2000 |
| WO | 03087993 | 10/2003 |
| WO | 04045985 | 6/2004 |
| WO | 2006034737 | 4/2006 |
| WO | 2006084402 | 8/2006 |
| WO | 2007039676 | 4/2007 |
| WO | 2010096939 | 9/2010 |

OTHER PUBLICATIONS

Machine Translation of EP1359097 to Dimmler.
"Composite Heating Device-heats a package contg. Food by injection of a hot blast and microwave irradiation;" Derwent, 1993, XP002348548 (Abstract) (corresponds to JP 05033941 filed with the previous Information Disclosure Statement).
"Container for Packing Food is Suitable for Heating in Microwave Oven and can be used for live shellfish in conjunction with vegetables and/or herbs and one or more sauces;" Derwent, 2001, XP002264598 (Abstract).
International Search Report of App. No. PCT/CH2006/000063—dated May 12, 2006.
Machine translation of RU 2341112.
International Search Report of App. No. PCT/CH2010/000023—dated Apr. 14, 2010.
Letter and Appendix from Canadian Bureau of Microbial Hazards, Evaluation Division, Jul. 9, 2012.
Dr. Hosahalli Ramaswamy, Consultation Documentation for HC/CFIA Approval of MicroPast Microwave Pasteurization Process, Canada.

* cited by examiner (State of the Art)

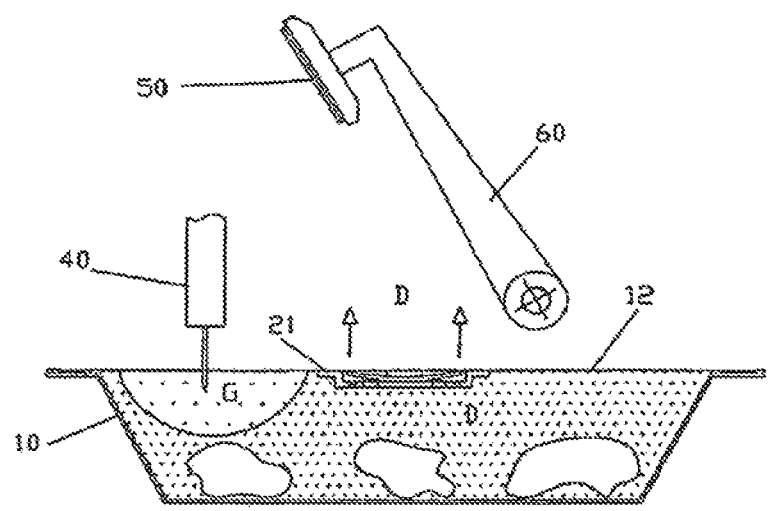
Fig.4
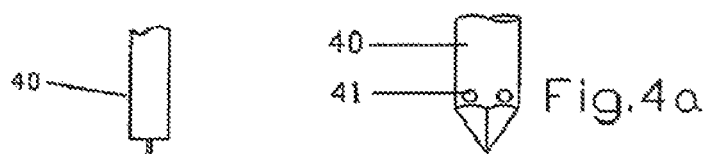
Fig.4a  Fig.5
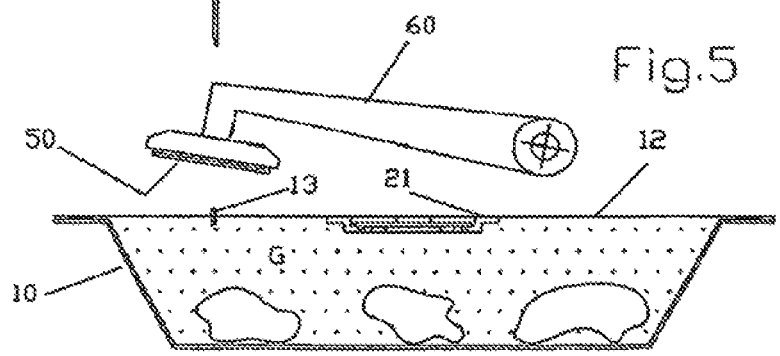
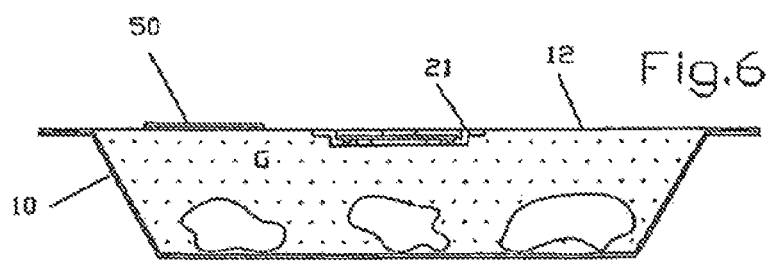
Fig.6

MAGNETRON CONTROL SYSTEM AND ASSOCIATED METHODOLOGY

CROSS-REFERENCE TO RELATED APPLICATIONS

This application is a continuation-in-part of U.S. application Ser. No. 14/300,615 filed Jun. 10, 2014, which is a continuation of U.S. application Ser. No. 11/883,675 filed Apr. 7, 2008, which is a National Stage application of International Application No. PCT/CH06/000063, filed on Feb. 1, 2006, which claims priority of Swiss application number 00219/05, filed on Feb. 10, 2005. The complete disclosures of the aforementioned applications are incorporated herein by reference in their entirety.

BACKGROUND

In food packaging processes, packaged food products may be sent through a thermal processing tunnel (e.g., pasteurization/microwave tunnel or the like). Shielding and parasitic antennas can be disposed within a package to cause some food components to be affected less or more by applied microwave radiation in the tunnel than other food components within the package. Yet, even with shielding and antenna configurations, it remains a challenge to properly pasteurize or cook certain packaged food products without undercooking or overcooking neighboring food components within the package.

SUMMARY

Aspects of this disclosure can relate to a control system that implements a preconfigured actuation scheme for a plurality of magnetrons in a thermal processing tunnel, such as a microwave tunnel, pasteurization tunnel, microwave/pasteurization chamber, or the like. The system can include at least one input device, at least one processor in communication with the input device, at least one memory, and computer-executable instructions stored on the memory. The computer-executable instructions can be executable by the processor for: receiving, via the at least one input device, an identifier indicating a predefined packaged food product configuration; based on the identifier, obtaining a preconfigured magnetron actuation scheme that is preconfigured based on at least one characteristic of the predefined packaged food product configuration, wherein the preconfigured magnetron actuation scheme is preconfigured to cause at least one of the plurality of magnetrons to have a different execution characteristic than at least one other magnetron of the plurality of magnetrons; and transmitting at least one instruction in accordance with the preconfigured magnetron actuation scheme to a signal controller that drives the plurality of magnetrons, thereby causing the plurality of magnetrons to execute in accordance with the preconfigured magnetron actuation scheme.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE FIGURES

Embodiments and implementations of the disclosed technology are described in detail below with reference to the drawings, in which:

FIG. 4 shows the injection of a gas via a cannula into the container after heating according to FIG. 2.

FIG. 4a shows an embodiment of the cannula tip in an enlarged diagram.

FIG. 5 shows the sealing of the puncture hole caused by the cannula according to FIG. 4 by an adhesive patch.

FIG. 6 shows the container from the preceding figures with the foods stabilized, gassed and sealed, or stabilized and sealed.

DETAILED DESCRIPTION

Figure 1A:
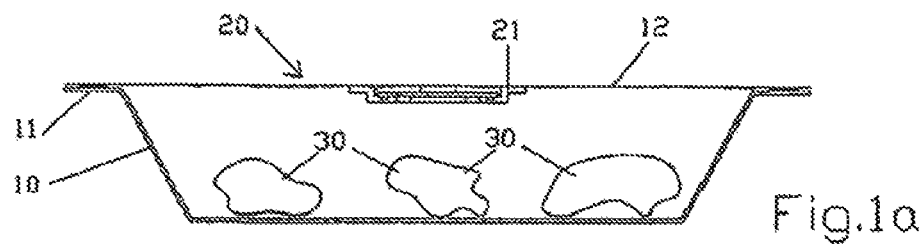
FIG. 1a shows a container having a valve as a vent opening and containing foods prior to the latter being thermally processed, this container being suitably implemented in accordance with an embodiment of this disclosure.

FIG. 1 shows a shell-shaped container 10 made of plastic with a peripheral edge 11 onto which is welded a cover film 12 also around the edge. The cover film may be a plastic film, optionally in several layers, with a thickness in the range between 40 and 220 μm. A vent opening 20 is provided in the cover film 12 through which a valve 21 that opens automatically under excess pressure and closes again automatically after the pressure has dropped and vacuum has formed, as is known essentially from EP1359097A1. Foodstuffs 30, which still have a certain inherent moisture content and are still in a pre-thermal processing state (e.g., raw, par cooked, frozen, etc.), are contained in the container 10.

Foodstuffs 30 can also have inherent differences in heating reaction to microwave energy. For example, foodstuffs 30 may have differing dielectric properties that result in different heating reactions to microwave energy.

Figure 1B:
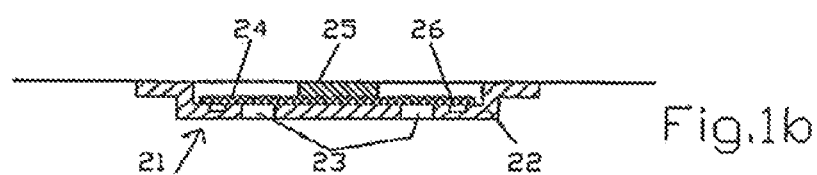
FIG. 1b shows the valve from FIG. 1a in an enlarged diagram.

FIG. 1b shows the valve 21 on an enlarged scale. It is made of plastic and has a dimensionally stable valve body 22 in which there are multiple openings 23. The openings 23 are sealed by an elastic membrane 24 which is held in position by a web 25. The sealing effect of the membrane is supported by sealing oil or grease which is present especially in a groove 26. The sealing oil or grease may be food safe in case of direct or indirect contact with food stuffs 30.

Figure 2A:
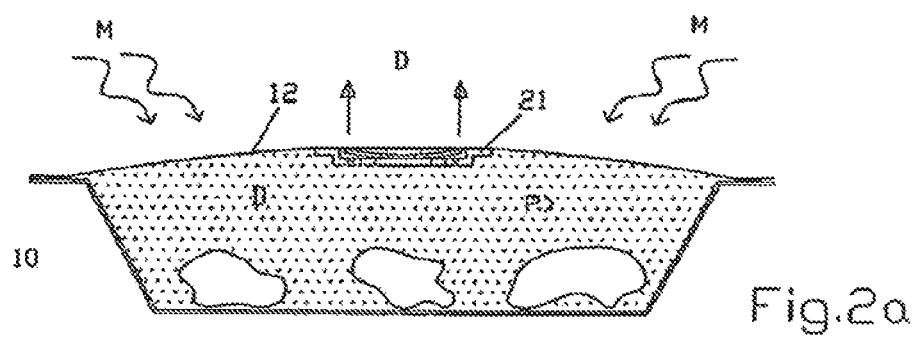
FIG. 2a shows the container from FIG. 1 during heating by microwave energy originating above and below the package.

FIG. 2a shows the container 10 during heating with microwaves M to stabilize the foodstuffs 30, with steam D being formed from the moisture present in the foodstuffs 30 and causing an excess pressure P> in the container 10 versus atmospheric pressure outside the container. Under the influence of this excess pressure P>, the valve 21 has opened so that steam D can flow out of the container 10. Furthermore, the cover film 12 has bulged up under the influence of the excess pressure P>.

Figure 2B:
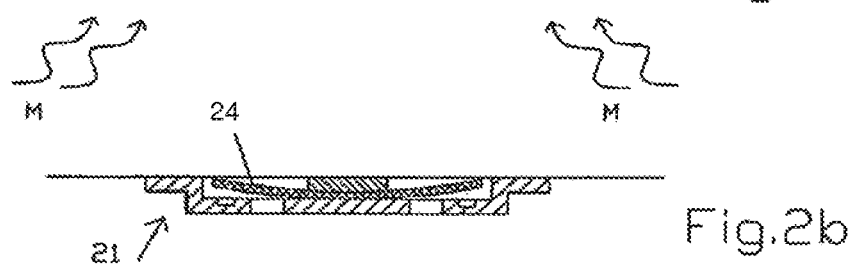
FIG. 2b shows the valve from FIG. 2a in an enlarged diagram.

FIG. 2b shows the valve 21 from FIG. 2a in the opened state with the membrane 24 having an elastic bulge.

Figure 3:
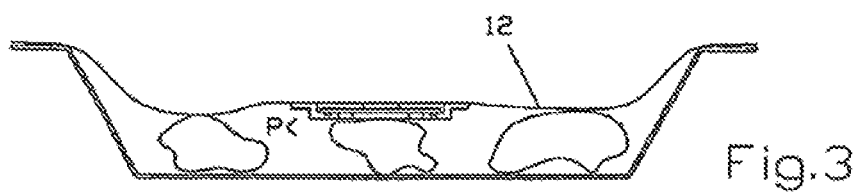
FIG. 3 shows the container of FIG. 1 or 2 after recooling and condensation of the vapor formed during heating.

If the container 10 of FIG. 2a were to be left to itself after being heated, then the valve 21 would close again at some point with the onset of recooling, a decline in vapor formation and another drop in pressure and then a considerable vacuum, reduction in pressure P<, would develop in the container 10 especially due to the resulting condensation of the vapor that is still present, as is known from the state of the art cited in the introduction, for example. FIG. 3 shows a container 10 having a cover film 12 bulging inward under such a vacuum reduction in pressure P<. Extreme vacuum due to cooling and condensation can cause significant package distortion/deformation. If sever enough, could jeopardize the hermetic seal and/or potentially create a crack in the base thus creating a food safety issue or risk.

The described technology counteracts the development of such a reduced pressure by injection of a gas G into the container 10. This is accomplished in FIG. 4 by a cannula 40 with which the cover film 12 (as the thinnest container wall) is punctured once. The container 10 can be evenly flushed with the gas G, expelling steam D through the valve 21. The gas G is injected, for example, with an excess pressure of 1-5 bar (e.g., 1-2 bar). In this case it is sufficient to flush the container for 1-20 seconds (e.g., approximately 8 seconds). The ranges and examples provided herein are for explanatory purposes; however, any value can be changed to accommodate the needs of a particular implementation. For example, flush time may be dependent on gas flowrate, headspace volume to be evacuated and/or desired end headspace make-up. The flush time can be varied and optimized for each different package and foodstuff combination.

The gas G can be any inert gas (e.g., nitrogen, $CO_2$, argon, and the like) or mixture of gases. In a preferred embodiment, for example, 99.999% nitrogen is used. In some embodiments, a mixture of nitrogen and $CO_2$ in a volume ratio of 90:10, 80:20,-70:30, 60:40, 50:50, or another mixture/ratio is used as the gas G, where the gas G can be precooled (e.g., to a temperature of less than 12° C.).

To prevent a reduced pressure P< from being able to develop even temporarily in the container 10, the injection of the gas G can be performed relatively rapidly, e.g., within 150 seconds after the end of heating. Other options can include, but are not limited to: (1) gas/seal quickly to obtain some vacuum, (2) use a hot hold tunnel, then gas/seal, obtain some vacuum, (3) use a hot hold tunnel, allow a cooling period (in a sterile or ultra clean environment), gas/seal, to obtain a lower level of vacuum, and the like. In some implementations, the container 10 can be pre-cooled in a clean environment for up to 20 minutes or more (e.g., possibly up to 40 minutes) prior to gassing in order to minimize package deformation from vacuum created when cooling after the container 10 is sealed.

FIG. 4a shows a preferred embodiment of the tip of a cannula 40 in an enlarged diagram which shows the actual tip as a rectangle provided with sharp polished edges to simplify insertion. Four outflow openings 41 for the gas G are distributed radially over the circumference above the polished area. An especially uniform and effective flushing of the container with gas is achieved with this embodiment.

FIG. 5 shows the container 10 after injection of the gas G, the cannula 40 having already been retracted back out of the container 10. Then approximately ambient pressure prevails in the container, this being discernible by the flat shape of the cover film 12. Excess pressure generated by the injection of the gas into the container 10 could be dissipated through the valve 21 and/or through the puncture hole 13 created by the cannula 40 in the cover film 12. The valve 21 was also able to close again and the pressure was successfully equalized.

In order for the valve 21 to be able to close tightly again, the abovementioned sealing oil or grease must at least not be flushed out completely by the hot steam flowing through the valve 21 during heating in the valve design illustrated in FIG. 1b. It is advantageous here if the sealing oil or grease is a silicone oil/grease and/or has a viscosity (at 20° C.) of 1000-20,000 Centipoise and/or is present in an amount of 4-8 mg.

To completely reclose the container 10, the puncture hole 13 in the cover film 12 is also sealed by applying an adhesive patch 50, as also depicted in FIG. 5.

For applying the adhesive patch 50, a stamp 60 which receives the adhesive patch 50 in its position shown in FIG. 4, for example, from a label dispenser (not shown), is used in FIG. 5 and holds the adhesive patch (e.g., by suction) until it is applied to the container 10.

The stamp 60 executes a pivoting movement, which is advantageous in that the container 10 need not be moved to apply the adhesive patch 50 after retraction (linear here) of the cannula 40. Application of the adhesive patch 50 immediately after retraction of the cannula 40 is therefore possible and is also ensured if the container is conveyed on a conveyor belt of a conveyor device, for example, and if the conveyor belt comes to a standstill. Alternatively or additionally, the cannulas 40 could of course also be guided in a nonlinear manner.

The adhesive patch 50 can also be applied immediately after retracting the cannula so that no microorganisms can enter the container from the outside. A period of time of 60 seconds between the injection of the gas and the application of the adhesive patch is tolerable, however. The inventors have found that a slight positive pressure remains in the container for 20-40 minutes or so (depending on many factors, such as size of hole, final temperature of food, and so forth). As long as the environment is clean and the pressure stays positive, this means that longer times before sealing can be used if needed/required even though one would typically seal as soon after gassing as possible.

FIG. 6 shows the container 10 with the foodstuffs 30 that have been stabilized in the gas atmosphere G under ambient pressure and the adhesive patch 50 which is attached here. In this form, the container is suitable for shipping and as a retail package and can be sent to a conventional refrigeration chain with refrigeration temperatures in the range between 1 and 8° C., for example.

Figure 7:
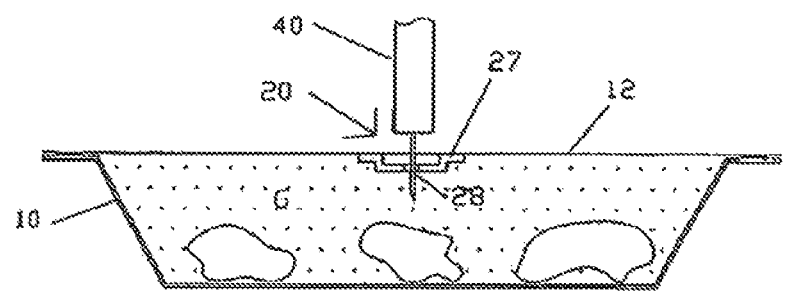
FIG. 7 shows another container having a simple vent opening and foods in the phase according to FIG. 4 whereby the gas is injected through the vent opening by a cannula.
Figure 8:
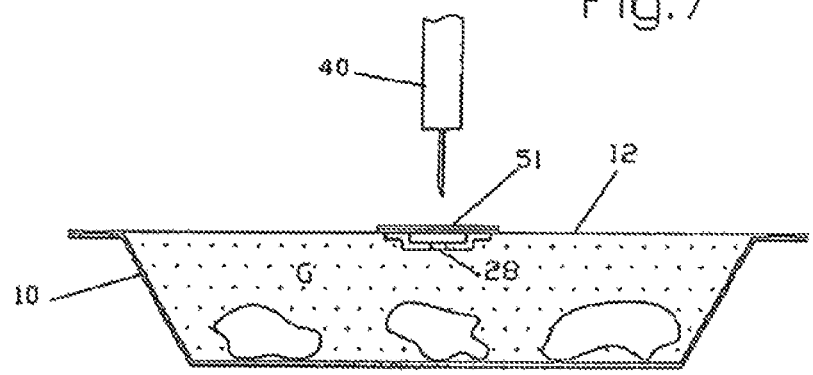
FIG. 8 shows the container from FIG. 7 after retraction of the cannula and closure of the vent opening with an adhesive patch.
Figure 9:
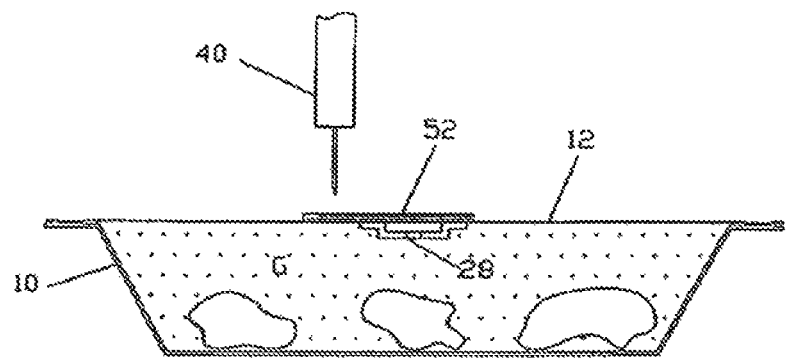
FIG. 9 shows a container with foods according to FIG. 8 but with the cannula inserted next to the vent opening and with the adhesive patch for sealing the puncture hole, shown on an enlarged scale accordingly.

FIGS. 7-9 show an alternative embodiment with a container 10 which, instead of being provided with a valve, has a vent opening 20 of a simple design in which the cover film 12 is provided. The vent opening 20, like the valve 21, may have a dimensionally stable body 27 with a defined opening 28 and therefore with a defined flow resistance which at least has not changed significantly under the stresses that occur during heating. In other embodiments, the vent opening 20 does not have a dimensionally stable body 27. For example, the cover film 12 may be strong enough on its own, or there may be a little extra strength from using a hot cannula to melt the vent opening 20 in the plastic, where the melting action creates a small ridge that strengthens the vent opening area. The vent opening 20 can be configured in several different shapes, for example, the vent opening 20 can be a hole, a slit, and X-cut aperture, and so forth. In some implementations, an X-cut aperture advantageously results in reduced weight/moisture loss as compared with a vent hole. For example, the inventors have found that weight loss (or moisture loss) of packaged food products was significantly reduced in switching to a ⅜" X-cut vent in the film from a ¼" vent hole. This was likely due to the flaps on the cut allowing release of pressure, but trapping the moisture on the underside of the film. In an example test scenario, the moisture loss of Brussel Sprouts was reduced by nearly 68%, while the moisture loss of Mac and Cheese was reduced by nearly 38%. The inventors also found that the variability of the loss was cut nearly in half by indication of the standard deviations.

After injection of the gas G, the opening 28 must be actively closed, which may again be accomplished with an adhesive patch.

In the example in FIG. 7, the gas G is injected directly through the opening 28 into the container 10 with a cannula 40, so that no additional injection hole is formed. In this case, it is sufficient to apply a single adhesive patch 51 over the opening 28 to seal the container 10. However, one disadvantage with this variant is that the container 10 cannot be flushed so effectively with the gas as this could restrict the evacuation of the steam and potentially over-pressurize the package increasing the risk of breaking the film seal.

It is also possible to inject the gas into the container 10 at a point that is not too great a distance away from the vent opening 20 and/or 28. In this case, flushing can be more effective because better evacuation of steam is allowed, and the container 10 can still be sealed by applying just one adhesive patch 52, optionally somewhat larger, as illustrated in FIG. 9. There is also the option of using vacuum draw-off of the steam from the vent opening 20 to improve flush and reduce condensation on top of film 12, thus improving adherence of seal to the film.

Figure 10:
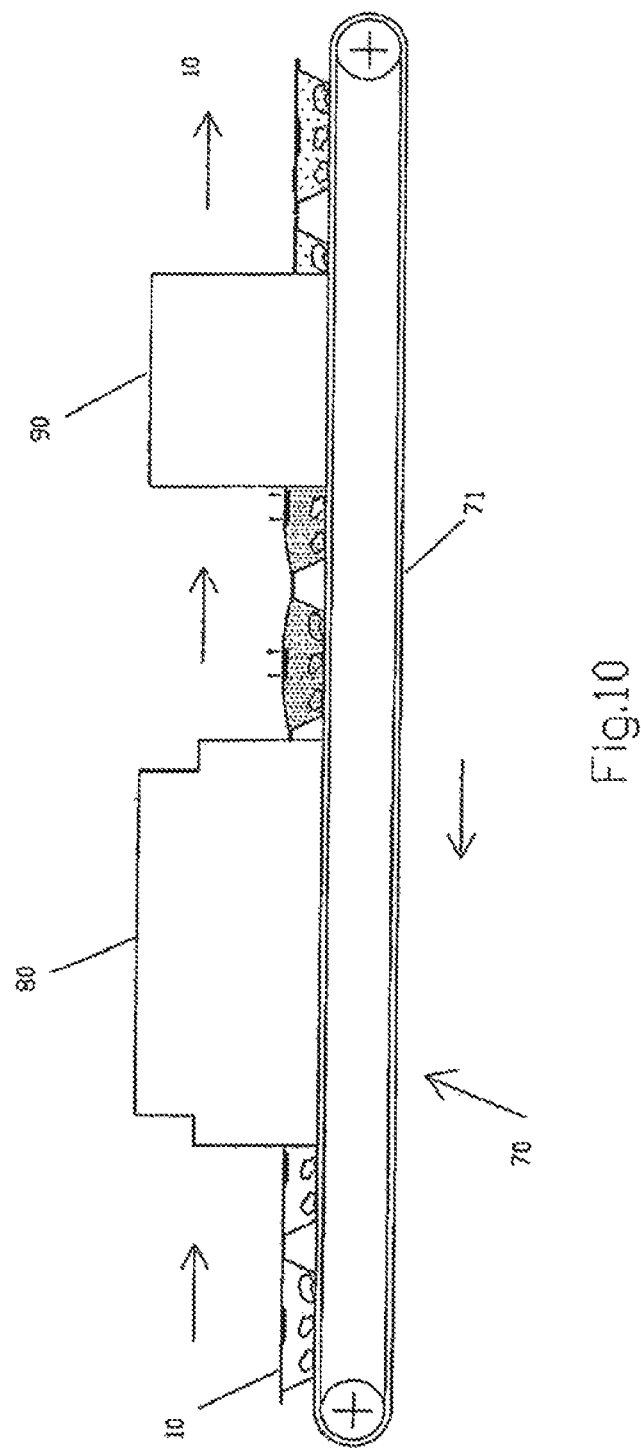
FIG. 10 shows a system for preserving foodstuffs, implemented in accordance with embodiments of the disclosure.

FIG. 10 shows a device for automated performance of the method described herein with a conveyor device 70 having a conveyor belt 71 which is passed through a microwave tunnel 80 and an injection station 90. A plurality of containers 10, as shown here, can be conveyed on the conveyor belt 71 through the microwave tunnel and through the injection station. The heating of the containers 10 and the foodstuffs contained in the containers takes place in microwave tunnel 80 by means of microwave energy, and in the injection station the gas injection described above is performed and the adhesive patch(es) is/are applied. The device from FIG. 10 may also be designed so that several containers are transported side-by-side in several rows through the microwave tunnel 80 and the injection station 90.

Figure 11:
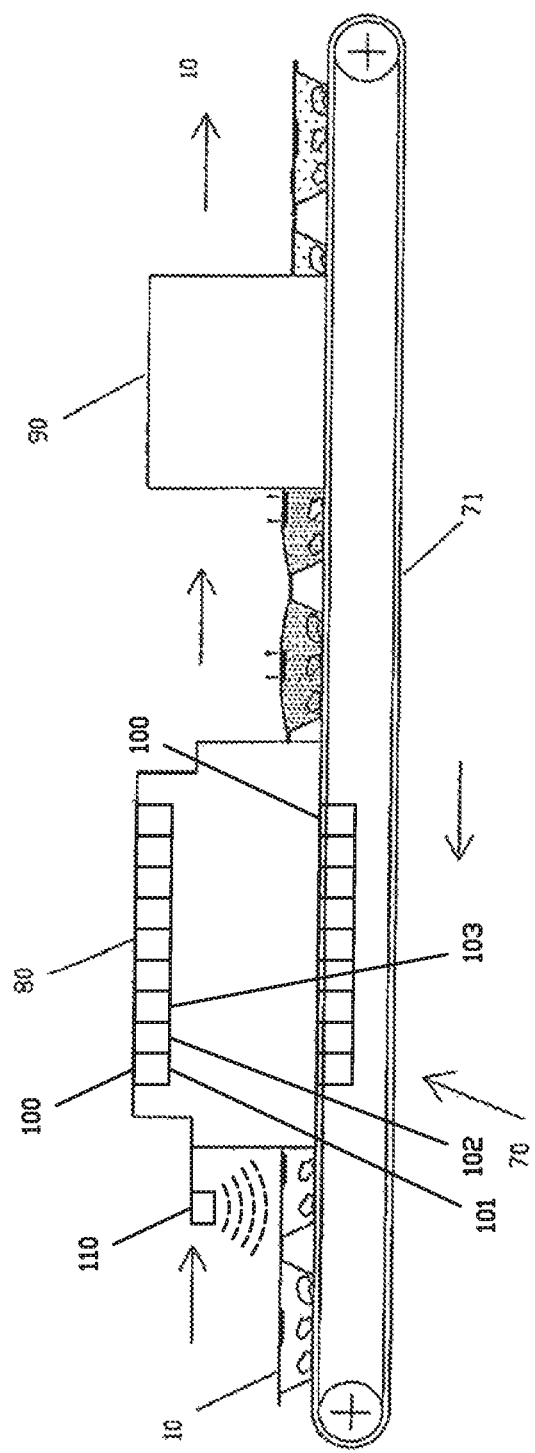
FIG. 11 shows a system for preserving foodstuffs, implemented in accordance with embodiments of the disclosure, wherein the system includes a thermal processing tunnel having a plurality of magnetrons that can be non-uniformly actuated.

FIG. 11 shows the device or system of FIG. 10, wherein the microwave tunnel 80 (sometimes referred to as a "thermal processing tunnel", "microwave/pasteurization chamber", or the like) includes a plurality of magnetrons 100. For example, the microwave tunnel 80 can include a first array of magnetrons 100 located above the conveyer belt 71 and a second array of magnetrons 100 located below the conveyer belt 71. The magnetrons 100 can be configured for non-uniform actuation. For example, a first magnetron 101 may be actuated to have a different execution characteristic (e.g., power level and/or wave frequency) than a second magnetron 102. In some implementations, a third magnetron 103 can also have a different execution characteristic according to a preconfigured magnetron actuation scheme, and so on. The foregoing examples are illustrative, but it shall be understood that a preconfigured magnetron actuation scheme can affect the respective execution characteristics of any number of individual magnetrons or groups of magnetrons to achieve a preconfigured wave power, frequency, distribution, and/or timing pattern applied to packaged food products disposed within the microwave tunnel 80.

In some embodiments, the system further includes a sensor 110 that can detect at least one characteristic of a predefined packaged food product configuration. For example, the sensor 110 can include at least one of an optical sensor, image sensor, a physical attribute (e.g., weight, dimension, shape, structural pattern, orientation) sensor, RFID sensor, barcode reader, or the like, which may be disposed within the microwave tunnel 80 or at or prior to an entrance of the microwave tunnel 80.

Figure 12:
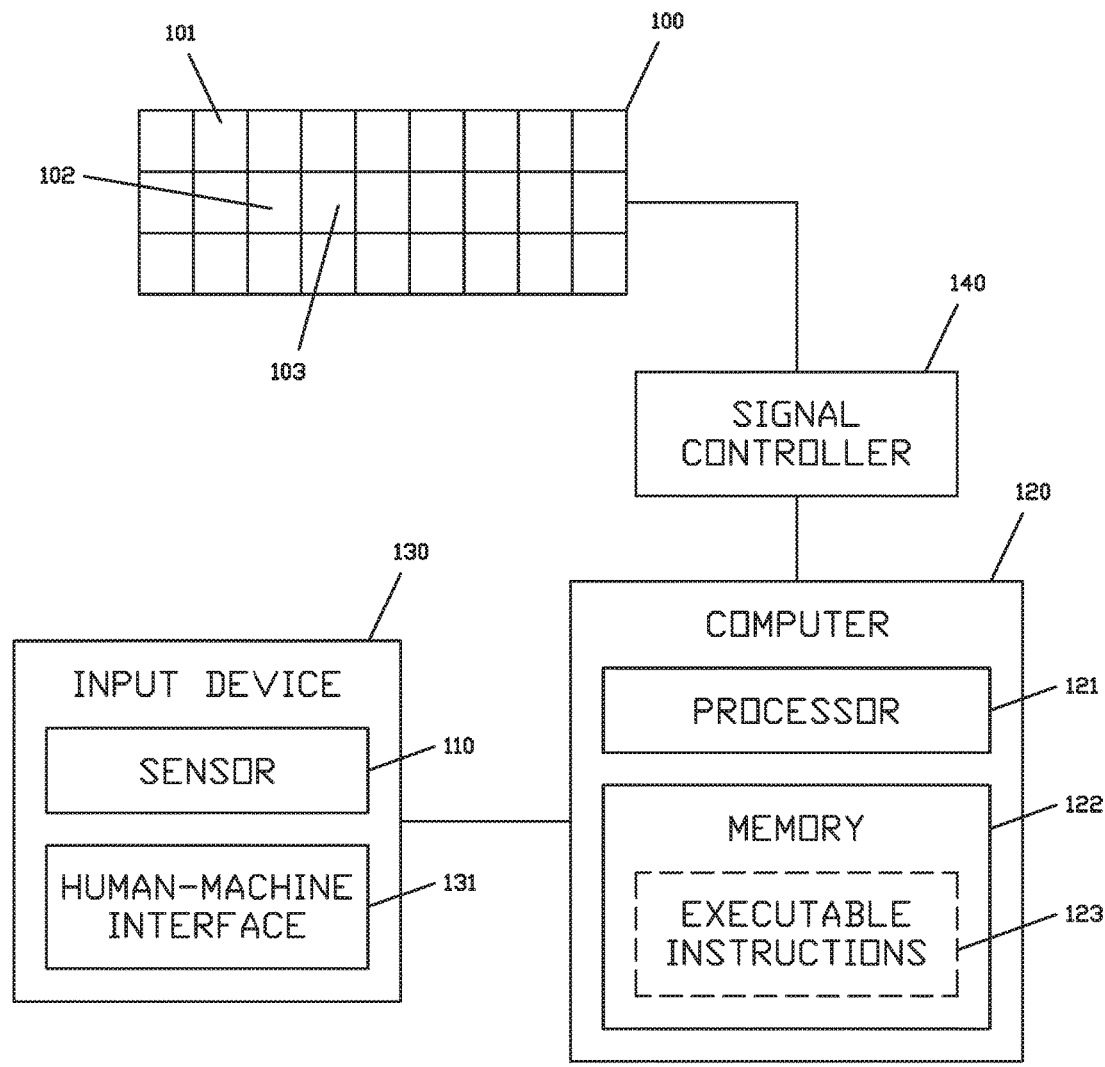
FIG. 12 shows a system for controlling a plurality of magnetrons of a thermal processing tunnel, such as the thermal processing tunnel of FIG. 11, in accordance with a preconfigured magnetron actuation scheme.

FIG. 12 is a block diagram illustrating a control system for actuating the magnetrons 100 according to a preconfigured magnetron actuation scheme that is selected based upon the detected (or user-input) characteristic of the predefined packaged food product configuration. When one or more packaged food products having a predefined configuration are to be processed by the system, an identifier that is associated with at least one characteristic of the predefined configuration can be entered via an input device 130. For example, the input device 130 can comprise the sensor 110 for automatically detecting one or more identifiers for a package or series of packages and/or a human-machine interface device 131 (e.g., touch panel, keyboard, mouse, or the like), wherein a user can manually enter the product identifier. The identifier can comprise a product and/or configuration code (e.g., Stock Keeping Unit (SKU) Number, Serial Number, Universal Product Code (UPC), etc.). The identifier can also be a detectable code, such as a barcode, RFID tag, physical attribute (e.g., dimension, shape, weight, packaging component/feature), detectable image characteristic (e.g., color arrangement, pattern(s), shape(s), etc.), and the like.

In embodiments, the system includes a computer 120 that receives the identifier for the predefined packaged food product configuration from the input device 130 and sends instructions corresponding to a preconfigured magnetron actuation scheme to a signal controller 140 that drives the magnetrons. The computer 120 can be a workstation, notebook computer, mobile device, or any computing device or controller that includes at least one processor 121 coupled to a memory 122 that has executable instructions 123 stored thereon. The processor 121 can execute the instructions 123, wherein the instructions 123 cause the processor 121 to communicate with the input device 130, furnish instructions to the signal controller 140, and perform any other operation necessary for implementing the control system for the magnetrons 100. For example, the computer-executable instructions 123 stored on memory 122 can be executable by the processor 121 to cause the processor to: receive, via the at least one input device 130, an identifier indicating a predefined packaged food product configuration; based on the identifier, obtain a preconfigured magnetron actuation scheme that is preconfigured based on at least one characteristic of the predefined packaged food product configuration, wherein the preconfigured magnetron actuation scheme is preconfigured to cause at least one of the plurality of magnetrons (e.g., magnetron 101) to have a different execution characteristic (e.g., a different supplied power level (e.g., higher, lower, or no supplied power) or a different wave frequency or signal pattern) than at least one other magnetron (e.g., magnetron 102 or 103) of the plurality of magnetrons 100; and transmitting at least one instruction in accordance with the preconfigured magnetron actuation scheme to a signal controller (e.g., a voltage or current source, or in some embodiments, a multi-channel voltage or current source) that drives the plurality of magnetrons 100, thereby causing the plurality of magnetrons 100 to execute in accordance with the preconfigured magnetron actuation scheme.

Figure 13:
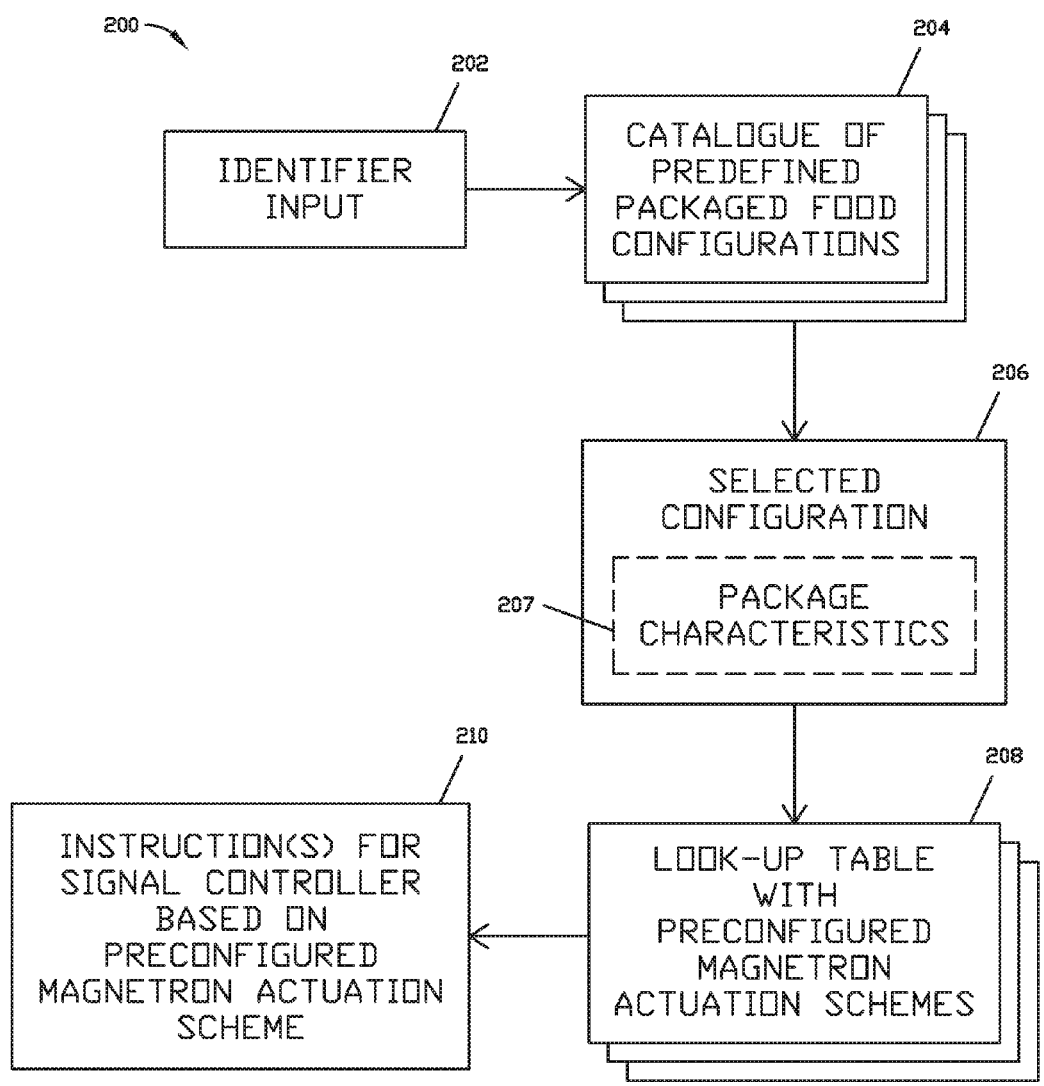
FIG. 13 shows a flow diagram that illustrates a process for controlling a plurality of magnetrons of a thermal processing tunnel, such as the thermal processing tunnel of FIG. 11, in accordance with a preconfigured magnetron actuation scheme.

FIG. 13 is a flow diagram illustrating a method 200 for controlling a plurality of magnetrons (e.g., magnetrons 100) of a thermal processing tunnel (e.g., microwave/pasteurization tunnel, chamber, or the like). At block 202, an identifier indicating a predefined packaged food product configuration is received (e.g., via input device 130). At block 204, the identifier is compared with a catalogue of predefined packaged food configurations. For example, a computer, such as computer 120, can compare a SKU number, UPC, or other input or detected package identifier against the catalogue (e.g., stored listing or database) of predefined packaged food configurations to determine a predefined packaged food configuration corresponding to the identifier. At block 206, at least one predefined packaged food configuration is selected from the catalogue, wherein the selected configuration corresponds to one or more package characteristics 207 (e.g., a spatial configuration of food within a package, a food type combination within a package, a microwave shielding or antenna arrangement associated with a package, or the like). At block 208, a look-up table is used to determine a preconfigured actuation scheme associated with the selected predefined packaged food configuration 206 or one or more corresponding characteristics 207. For example, the look-up table can include a plurality of preconfigured actuation schemes that may be setup for corresponding predefined packaged food configurations 206 or determined based upon one or more corresponding characteristics 207. Thus, based on the identifier, a preconfigured magnetron actuation scheme is obtained, that is preconfigured based on at least one characteristic of the predefined packaged food product configuration. As discussed herein, the preconfigured magnetron actuation scheme is preconfigured to cause at least one of the plurality of magnetrons to have a different execution characteristic than at least one other magnetron of the plurality of magnetrons. At block 210, at least one instruction for executing the preconfigured magnetron actuation scheme is transmitted (e.g., from computer 120) to a signal controller (e.g., signal controller 140) that drives the plurality of magnetrons, thereby causing the plurality of magnetrons to execute in accordance with the preconfigured magnetron actuation scheme.

Figure 14A:
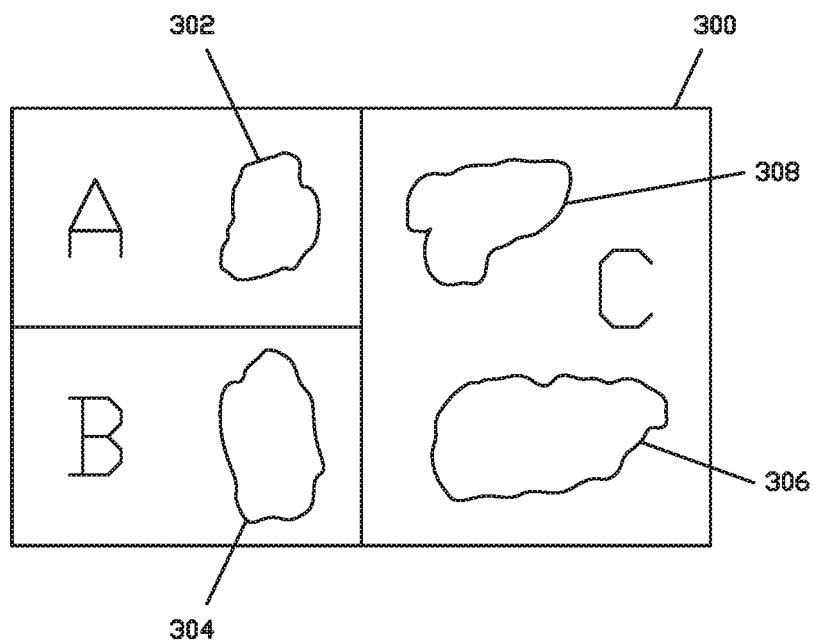
FIGS. 14a through 14e show examples of packaged food configurations implemented in accordance with embodiments of this disclosure.

FIGS. 14a through 14e show examples of packaged food configurations that can correspond to respective preconfigured magnetron actuation schemes. As shown in FIG. 14a, a container 300 may have one or more compartments (e.g., compartments A, B, and C). Each compartment can have one or more food types disposed therein. For example, compartment A can include a first food type 302, compartment B can include a second food type 304, and compartment C can include a third food type 306 and a fourth food type 308. These examples are not in any way intended to restrict the present disclosure, but they are instead provided to illustrate a variety of possible food type arrangements within a container, and even within a single compartment.

In some implementations, a corresponding magnetron actuation scheme can cause one or more magnetrons that primarily affect one of the compartments (e.g., compartment A) to provide signals with different execution characteristics (e.g., different power level or frequency) to the foodstuffs than one or more magnetrons that primarily affect a different one of the compartments (e.g., compartment B). In some cases, where different food types (e.g., food types 306 and 308) are in the same compartment (e.g., compartment C), the corresponding magnetron actuation scheme can cause one or more magnetrons to provide different execution characteristics for one portion of the compartment than the execution characteristics provided for another portion of the compartment.

Figure 14B:
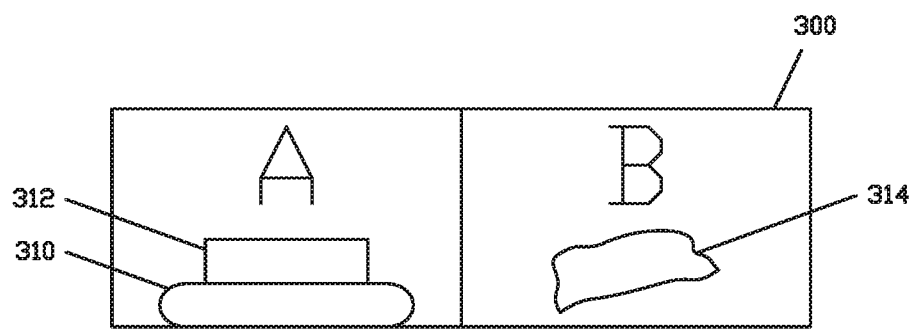

The execution characteristics may be based on layered foodstuffs. For example, FIG. 14b shows an example container, wherein one of the compartments (compartment B) includes a single food type 314, but another compartment (compartment A) includes a first food type 310 with a second food type 312 positioned on top of the first food type 310. In such cases, the preconfigured magnetron actuation scheme can cause the magnetrons 100 to execute in such a manner that waves with different penetration characteristics (e.g., due to differing frequencies) can have different power levels to pasteurize or cook the respective ones of the affected food types properly. For example, at least one magnetron (e.g., magnetron 101) may provide waves at a first frequency and a first power level, while at least one other magnetron (e.g., magnetron 102) provides waves at a second frequency and a second power level, wherein the first food type 310 is affected by waves at the first frequency more than the second frequency, and the second food type 312 is affected by waves at the second frequency more than the first frequency.

Figure 14C:
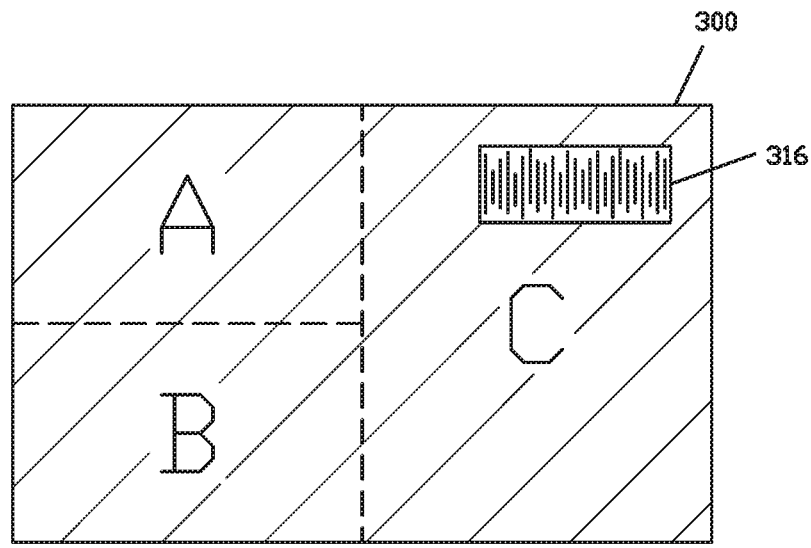
Figure 14D:
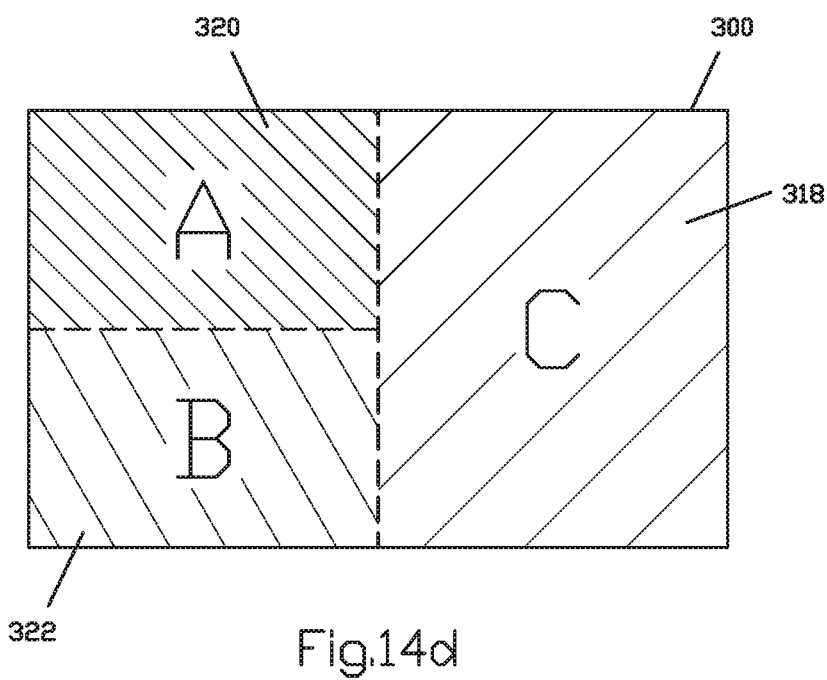

In some implementations, the identifier is a user input code or value that can be input using a human-machine interface device 131. In some implementations, the identifier is a barcode 316, as shown in FIG. 14c, RFID tag, or other detectable identification code or value that can be detected using sensor 110. The sensor 110 can additionally or alternatively be configured to identify the package configuration using image recognition or through identification of patterns or spatial attributes associated with the packaging. For example, FIG. 14d shows an example of a container 300 having patterned or otherwise identifiable (e.g., color-coded) lid portions (e.g., package cover 320 positioned over compartment A, package cover 322 positioned over compartment B, and package cover 318 positioned over compartment C).

In some implementations, the sensor 110 can comprise an infrared (IR) camera or another sensor for differentiating temperature differences of the food types/components 310 and/or package compartments. The pattern/configuration of food components with differing temperatures (i.e., the detected temperature map of the package) can be used to configure the magnetron actuation scheme. For example, the magnetron actuation scheme can be selected from a set of pre-configured actuation schemes based on identifying a temperature map from the package based on a comparison of the detected temperature map and a plurality of predetermined package temperature maps In other implementations, the magnetron actuation scheme can be generated based on the unique temperature map of the scanned package. In some implementations, the magnetron actuation scheme can be set for a batch of incoming packages based on scanning one package from the batch (e.g., the first package).

Figure 14E:
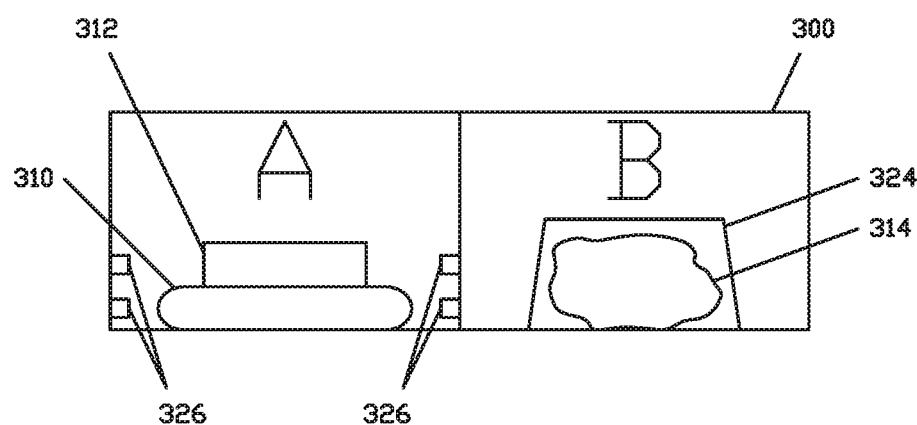

As shown in FIG. 14e, predefined packaged food products can also have specific antenna or shielding configurations. In some cases, the sensor 110 can detect the antenna and/or shielding configuration. In other cases, the antenna and/or shielding configuration is a characteristic that can be determined based upon the detected or user input identifier. In FIG. 14e, compartment A has an example antenna configuration, wherein parasitic microwave antennas 326 are positioned around food types 310 and 312, and compartment B has an example shielding configuration, wherein a microwave shielding structure 324 is located over food type 314. The preconfigured magnetron actuation scheme can be based on these antenna and/or shielding configurations. For example, the magnetrons 100 can be controlled to provide an execution pattern that works with the antennas 326 to achieve uniform cooking or thermal processing of food type 310 and/or food type 312, and/or controlled to avoid and/or minimize microwaving the shielded food type 314.

While several example packaged food configurations and use scenarios are described herein, none of these are intended as restrictions on the present disclosure. These examples are provided to show that any number of predefined package configurations can be associated with corresponding preconfigured magnetron actuation schemes in accordance with implementations of the disclosed systems and methodology. These systems and methods can streamline processing of packaged food products. For example, one or more packaged foods can be sent into the system (e.g., via the conveyer belt 71) and microwaved according to a magnetron actuation scheme that is appropriate to the predefined packaged food configuration. Rather than having to manually calibrate the system each time a different packaged food configuration is inserted, the systems and methodology described herein allow for any number of predefined packaged food configurations to be processed seamlessly by automatically controlling the magnetrons 100 based upon a user input or sensor input (e.g., automatically detected) identifier. For example, a first predefined packaged food configuration can be microwaved according to a first preconfigured magnetron actuation scheme that is based on a first identifier associated with the first predefined packaged food configuration, and a second predefined packaged food configuration can be microwaved according to a second preconfigured magnetron actuation scheme that is based on a second identifier associated with the second predefined packaged food configuration, and so on. In this regard, packages can be inserted (e.g., via the conveyer belt 71) into the microwave tunnel and processed with little to no delay for magnetron calibration/optimization when switching from one predefined packaged food configuration to another.

Those skilled in the art will appreciate that the forgoing steps or operations can be carried out in any order, unless otherwise indicated herein, and that one or more steps may be carried out substantially simultaneously or at least partially in parallel. It should be further recognized that the various functions, operations, blocks, or steps described throughout the present disclosure may be carried out by any combination of hardware, software, or firmware. Various steps or operations may be carried out by one or more of the following: electronic circuitry, logic gates, multiplexers, a programmable logic device, an application-specific integrated circuit (ASIC), a controller/microcontroller, or a computing system. A computing system may include, but is not limited to, a personal computing system, mainframe computing system, workstation, image computer, parallel processor, or any other device known in the art. In general, as used herein, the terms "controller" and "computer" are broadly defined to encompass any device having one or more processors, which execute instructions from a memory device.

Program instructions (i.e., computer-executable instructions) implementing methods, such as those manifested by embodiments described herein, may be stored on memory device. The memory device can include a non-transitory signal bearing medium or storage medium such as, but not limited to, a read-only memory, a random access memory, a magnetic or optical disk, a solid-state or flash memory device, or a magnetic tape.

It is contemplated that any embodiment of the disclosure manifested above as a system or method may include at least a portion of any other embodiment described herein. Those having skill in the art will also appreciate that there are various embodiments by which systems and methods described herein can be implemented, and that the implementation will vary with the context in which an embodiment of the disclosure is deployed. Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for controlling a plurality of magnetrons of a thermal processing tunnel in accordance with a preconfigured magnetron actuation scheme, the system comprising:
   at least one input device;
   at least one processor in communication with the input device;
   at least one memory; and
   computer-executable instructions stored on the at least one memory and being executable by the at least one processor for:
      receiving, via the at least one input device, an identifier indicating a predefined packaged food product configuration;
      based on the identifier, obtaining a preconfigured magnetron actuation scheme that is preconfigured based on at least one characteristic of the predefined packaged food product configuration, wherein the preconfigured magnetron actuation scheme is preconfigured to cause at least one of the plurality of magnetrons to have a different execution characteristic than at least one other magnetron of the plurality of magnetrons; and
      transmitting at least one instruction in accordance with the preconfigured magnetron actuation scheme to a signal controller that drives the plurality of magnetrons, thereby causing the plurality of magnetrons to execute in accordance with the preconfigured magnetron actuation scheme.

2. The system of claim 1, wherein receiving the identifier indicating the predefined packaged food product configuration includes receiving a selection of the identifier from a catalogue of a plurality of identifiers indicating respective predefined packaged food product configurations.

3. The system of claim 1, wherein the at least one input device comprises a sensor disposed at an entrance of the thermal processing tunnel or within the thermal processing tunnel, wherein receiving the identifier indicating the predefined packaged food product configuration includes receiving a sensor input associated with the identifier from the sensor.

4. The system of claim 1, wherein the at least one characteristic of the predefined packaged food product configuration includes a spatial configuration of food within a package.

5. The system of claim 1, wherein the at least one characteristic of the predefined packaged food product configuration includes a food type combination within a package.

6. The system of claim 1, wherein the at least one characteristic of the predefined packaged food product configuration includes a temperature map of food within the food package assembly.

7. The system of claim 1, wherein the at least one characteristic of the predefined packaged food product configuration includes a microwave shielding arrangement associated with a package.

8. The system of claim 1, wherein the at least one characteristic of the predefined packaged food product configuration includes a microwave antenna arrangement associated with a package.

9. The system of claim 1, wherein the execution characteristic is at least one member of a group consisting of: a supplied power level to the magnetron, no power to the magnetron, and a wave frequency.

10. A computer-readable medium having computer executable instructions stored thereon, wherein the computer-executable instructions, when executed by a processor, are configured for:

receiving, via at least one input device, an identifier indicating a predefined packaged food product configuration;

based on the identifier, obtaining a preconfigured magnetron actuation scheme that is preconfigured based on at least one characteristic of the predefined packaged food product configuration, wherein the preconfigured magnetron actuation scheme is preconfigured to cause at least one of the plurality of magnetrons to have a different execution characteristic than at least one other magnetron of the plurality of magnetrons; and transmitting at least one instruction in accordance with the preconfigured magnetron actuation scheme to a signal controller that drives the plurality of magnetrons, thereby causing the plurality of magnetrons to execute in accordance with the preconfigured magnetron actuation scheme.

* * * * *